United States Patent [19]

Tanaka

[11] Patent Number: 4,962,523
[45] Date of Patent: Oct. 9, 1990

[54] RADIO TELEPHONE SET USED AS PORTABLE SET AND VEHICLE-MOUNTED SET

[75] Inventor: Mituru Tanaka, Tokyo, Japan

[73] Assignee: NEC Corporation, Tokyo, Japan

[21] Appl. No.: 302,900

[22] Filed: Jan. 30, 1989

[30] Foreign Application Priority Data

Jan. 29, 1988 [JP] Japan .................................. 63-16935

[51] Int. Cl.⁵ .......................... H04M 1/02; H04B 7/00
[52] U.S. Cl. .......................................... 379/58; 379/61;
455/346; 455/127; 455/89
[58] Field of Search ...................... 379/61, 62, 63, 354,
379/58; 330/127; 455/67, 89, 127, 345, 346

[56] References Cited

U.S. PATENT DOCUMENTS

| | | | |
|---|---|---|---|
| 4,272,650 | 6/1981 | Bolgiano et al. | 379/61 |
| 4,418,426 | 11/1983 | Singletary | 455/67 |
| 4,458,111 | 7/1984 | Sugihara | 379/61 |
| 4,636,741 | 1/1987 | Mitzlaff | 330/127 |
| 4,647,722 | 3/1987 | Nishida et al. | 379/63 |
| 4,731,814 | 3/1988 | Becker et al. | 379/62 |
| 4,736,410 | 4/1988 | Nishida et al. | 379/354 |

Primary Examiner—Jin F. Ng
Assistant Examiner—Jhancy Augustus
Attorney, Agent, or Firm—Sughrue, Mion, Zinn, Macpeak & Seas

[57] ABSTRACT

A radio telephone set comprises switch circuitry, a telephone circuit and a battery for portable operation, which battery may be a built-in battery. When the radio telephone set is not mounted on a vehicle, the switch circuitry is not connected to a battery of the vehicle and feeds power from the built-in battery to the telephone circuit. Thus, the radio telephone set can be used as a portable set. When the radio telephone set is mounted on the vehicle, the switch circuitry is connected to the vehicle battery and this connection causes the automatic switching of the power supply to the telephone circuit from the built-in battery to the vehicle battery. Thus, the radio telephone set can be used as a vehicle-mounted, or onboard, set.

19 Claims, 2 Drawing Sheets

RADIO TELEPHONE SET USED AS PORTABLE SET AND VEHICLE-MOUNTED SET

BACKGROUND OF THE INVENTION

The present invention relate to a radio telephone set and, more particularly, to a radio telephone set which can be used as a portable set and a vehicle-mounted set.

Recently, a single radio telephone set has been used as both a portable set and a vehicle-mounted, or onboard, set. When a radio telephone set is used as a portable set, it is powered by a battery attached thereto. When the radio telephone set is used as an onboard set, it is powered by a vehicle battery.

A conventional radio telephone set, which will be described later referring to FIG. 1 of the accompanying drawings, has a power supply (PS) terminal and an ignition (IGN) terminal which are connectable not only with the attached battery but also with the vehicle battery. More specifically, when the radio telephone set is used as a portable set, the PS and IGN terminals are connected to the output terminals of the attached battery. When the telephone set is used as an onboard set, the PS and IGN terminals are connected to the terminals of the vehicle battery. Thus, the user must detach the attached battery when using the telephone set as an onboard set. On the other hand, he/she must re-attach the detached battery to the telephone set when using the telephone set as a portable set. This procedure is cumbersome, especially, to those who frequently change the use mode of radio telephone set.

SUMMARY OF THE INVENTION

An object of the present invention is therefore to provide a generally improved radio telephone set which can be used as a portable set and an onboard set without giving the above-mentioned disadvantage.

Another object of the present invention is to provide a radio telephone set which automatically switches power supply between a built-in battery and a vehicle battery by simply mounting or de-mounting the telephone set on or from the vehicle.

Yet another object of the present invention is to provide a radio telephone set to be used as portable and onboard sets and having a circuit preventing a battery built therein from overdischarging.

According to the present invention, there is provided a radio telephone set which is to be used as a portable set and a set mounted on a vehicle which has a vehicle battery. The radio telephone set comprises a radio telephone circuit which includes a load and a first power supply (PS) terminal and a first ignition (IGN) terminal. The load is provided with power through the first PS terminal. The telephone set also comprises a battery built therein and second PS and IGN terminals. The second PS and IGN terminals are to be connected to the vehicle battery. A power supply terminal (PST) switch is connected to the first and second PS terminals and to the built-in battery. The PST switch connects the first PS terminal to the built-in battery in response to a first control signal and switches the connection of the first PS terminal from the built-in battery to the second PS terminals in response to a second control signal.

According to an embodiment of the invention AND gate has two inputs connected to the second PS and IGN terminals, respectively. The AND gate provides the first control signal when either one or both of the voltages at its inputs are low, and provides the second control signal when both the voltages at its inputs are high. An ignition terminal (IGNT) switching circuit is connected to the second PS terminal, to the first and second IGN terminals and to the built-in battery. The IGNT switching circuit connects the first IGN terminal to the built-in battery when a voltage at the second PS terminal is low and switches the connection of the first IGN terminal from the built-in battery to the second IGN terminal when the voltage at the second PS terminal is high.

BRIEF DESCRIPTION OF THE DRAWINGS

The above and other objects, features and advantages of the present invention will become more apparent from the following description referring to the accompanying drawings, in which.

DETAILED DESCRIPTION OF THE PREFERRED EMBODIMENT

Figure 1:
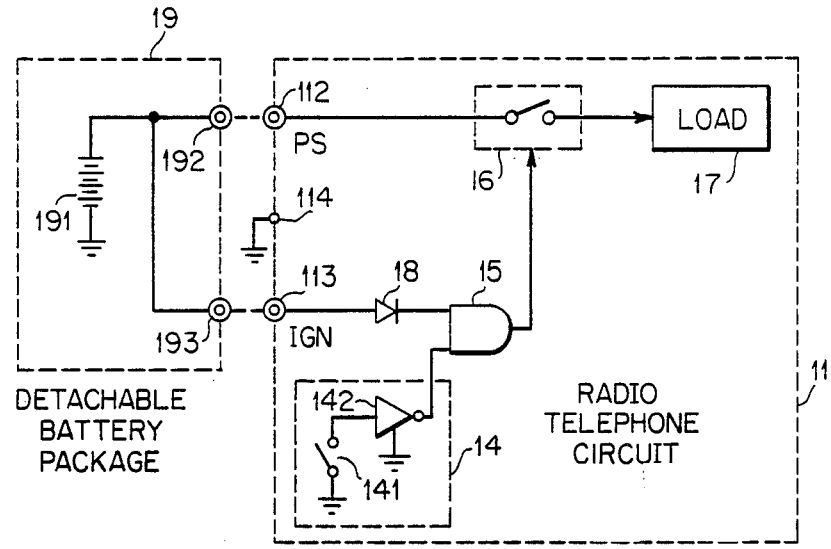
FIG. 1 shows a block diagram of a conventional radio telephone set with a detachable battery package.

To better understand the present invention, a conventional radio telephone set will first be described with reference to FIGS. 1 and 2. In FIG. 1, a radio telephone circuit 11 comprises a load 17 including a transmitter, a receiver, a handset and so on. The load 17 is applied with power through a power supply (PS) terminal 112 and a power switch 16. The power switch 16 is controlled by the output of an AND gate 15. The AND gate 15 has two outputs, respectively receiving a signal through an ignition (IGN) terminal 113 and a diode 18, and an output of a switch circuit 14. The switch circuit 14 includes a manual switch 141 and an inverter 142. A terminal 114 is a common potential terminal.

Figure 2:
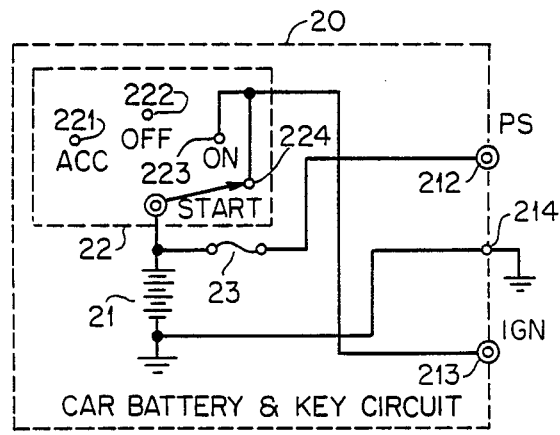
FIG. 2 shows a schematic circuit diagram of a car battery and engine key circuit.

The PS and IGN terminals 112 and 113 are to be connected, respectively, to either the terminals 192 and 193 of a detachable battery package 19 or the PS and IGN terminals 212 and 213 of a car battery and engine key circuit 20 (FIG. 2). The battery package 19 includes a battery 191 whose positive terminal is to be connected to both the terminals 192 and 193. When the telephone set is used as a portable set, the battery package 19 is attached to the telephone circuit 11 to thereby connect the PS and IGN terminals 112 and 113 to the battery terminals 192 and 193, respectively. This provides a high level signal to one input of AND gate 15 through the terminals 193 and 113 and the diode 18. In this condition, if the manual switch 141 is closed, the inverter 142 porvides a high level signal to the other input of AND gate 15. As a result, the AND gate 15 produces a high level signal which in turn causes the switch 16 to be closed. Thus, power is applied from the battery 191 to the load 17 through the terminals 192 and 112 and the switch 16.

When the telephone set is used as an onboard set, the battery package 19 is detached from the telephone circuit 11 and instead the telephone set is attached to a vehicle to connect the PS and IGN terminals 112 and 113 to the PS and IGN terminals 212 and 213 of car battery and engine key circuit 20, respectively (FIG. 2). The circuit 20 includes a car, or vehicle, battery 21 whose positive and negative terminals are coupled through a fuse 23 to the PS terminal 212 and directly to a common potential terminal 214, respectively. The circuit 20 also includes an engine key unit 22 which has ACC (accessary), OFF, ON and START terminals 221-224. The ON and START terminals are connected to the IGN terminal 213. If an engine key is positioned on the ON or START terminal, the positive voltage is applied to the IGN terminal 213, resulting in obtaining the same condition above-mentioned with respect to the battery package 19 when a positve voltage is applied to IGN terminal 113.

As mentioned earlier, the battery package 19 must be attached to or detached from the telephone circuit whenever the use mode of telephone set is changed. This makes the use of the telephone set cumbersome. The present invention eliminates this disadvantage.

Figure 3:
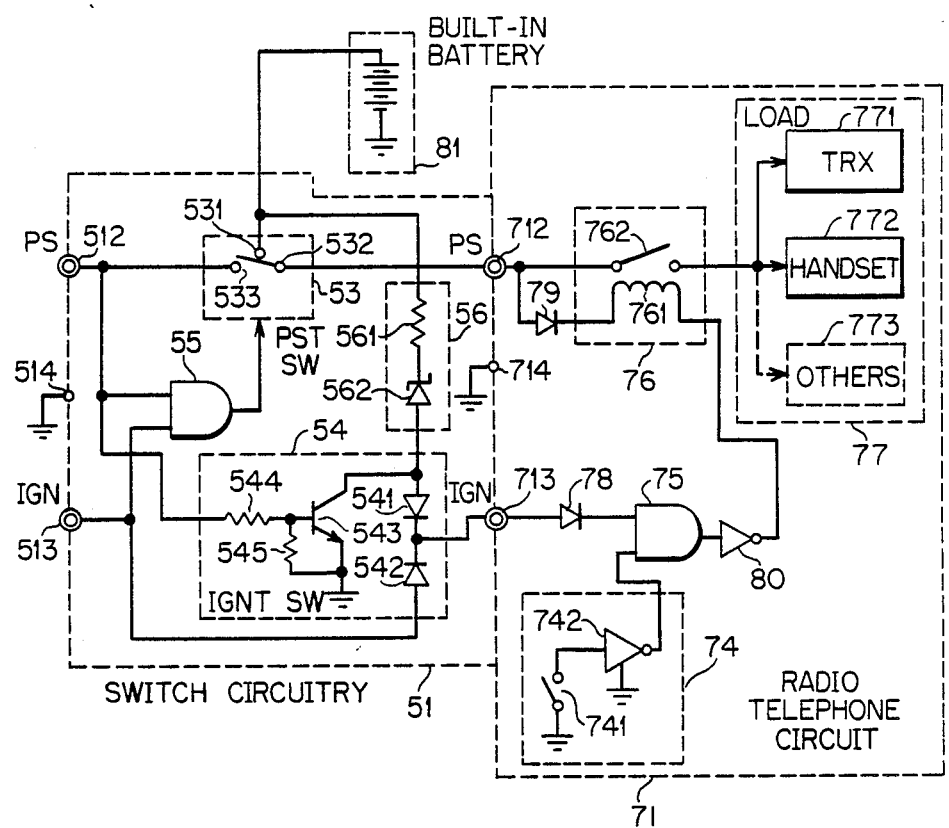
FIG. 3 shows a block diagram of a radio telephone set embodying the present invention.

In FIG. 3, a radio telephone set according to the invention comprises a radio telephone circuit 71, switch circuitry 51 and a battery 81 built therein. The radio telephone circuit 71 comprises elements similar to those in the conventional telephone set of FIG. 1. The telephone circuit 71 comprises a load 77 including a transmitter/receiver 771 and a handset 772. The load 77 may include other circuits 773 which require power to operate. Power is applied to the load 77 through a PS terminal 712 and a relay switch 76. The relay switch 76 is comprised of an energizing coil 761 and a contact, or armature, 762 and is controlled by the output of AND gate 75.

The AND gate 75 has an output terminal connected to the relay switch 76 through an inverter 80. The AND gate 75 also has two input terminals respectively receiving a signal through an IGN terminal 713 and a diode 78, and an output of a switch circuit 74. The switch circuit 74 includes a manual switch 741 and an inverter 742. A terminal 714 is a common potential terminal. Diodes 78 and 79 are provided to prevent the telephone circuit 71 from being damaged in case voltages of the wrong polarity are applied to the PS and IGN terminals 712 and 713.

When positive voltages are applied to the PS and IGN terminals 712 and 713, respectively, and the manual switch 741 is closed, the AND gate 75 provides a high level output to the inverter 80 which in turn provides a low level output to one end of the coil 761 of relay switch 76. Since the positive voltage is applied to the other end of coil 761 through diode 79, current flows through the coil 761, so that the contact 762 is closed. As a result, power is applied to the load 77 through the relay switch 76. If the manual switch 741 is open, no power is applied to the load 77 even if positive voltages are applied to the PS and IGN terminals 712 and 713, respectively.

The switch circuitry 51 comprises a power supply terminal (PST) switch 53, an ignition terminal (IGNT) switch circuit 54, and AND gate 55, an overdischarge prevention (ODP) circuit 56, and PS, IGN and common potential terminals 512-514. The PST switch 53 is under control of AND gate 55 and has three terminals 531, 532 and 533 connected with the positive terminal of built-in battery 81, the PS terminal 712 and the PS terminal 512, respectively. The IGNT switch circuit 54 comprises two diodes 541 and 542 whose cathodes are connected to each other and anodes are respectively connected to the ODP circuit 56 and to the IGN terminal 513. The switch circuit 54 also comprises a transistor 543 which has a collector connected to the anode of diode 541, an emitter connected to ground and a base connected to the junction of resistors 544 and 545. The resistors 544 and 545 are connected to the PS terminal 513 and the emitter of transistor 543, respectively.

The AND gate 55 has two input terminals respectively connected to the PS and IGN terminals 512 and 513, and provides its output to the PST switch 53. The ODP circuit 56 includes a series connection of a resistor 561 and a Zener diode 562. The resistor 561 is connected between the positive terminal of battery 81 and the cathode of Zener diode 562. The anode of Zener diode 562 is connected to the anode of diode 541. The PS and IGN terminals 512 and 513 are to be connected to the PS and IGN terminals 212 and 213 of car battery and engine key circuit 20 (FIG. 2).

In operation, when the voltage of built-in battery 81 is greater than a predetermined voltage $V_z$ which is determined by the Zener voltage of Zener diode 562, the power is applied from the battery 81 to the anode of diode 541 through the ODP circuit 56. If the voltage of battery 81 falls below the voltage $V_z$, no power is applied from the battery 81 to the anode of diode 541. Thus, the overdischarge of battery 81 can be prevented by setting the voltage $V_z$ to a suitable value.

Assume that the voltage of battery 81 is greater than the voltage $V_z$ and that nothing is connected to the PS and IGN terminals 512 and 513. Since a voltage at the PS terminal 512 is low, the AND gate 55 provides a low level signal to the PST switch 53 to make the terminal 532 contact the terminal 531. Accordingly, power is applied from the battery 81 to the PS terminal 712 of telephone circuit 71. Furthermore, the transistor 543 turns off, so that the positive voltage of battery 81 is applied to the IGN terminal 713 through the ODP circuit 56 and the diode 541. Thus, the telephone circuit 71 operates with power from the built-in battery 81. The radio telephone set can therefore be used as a portable set.

Next, assume that the PS and IGN terminals 512 and 513 of switch circuitry 51 are connected to the PS and IGN terminals 212 and 213 of car battery and engine key circuit 20 (FIG. 2), respectively. In this condition, if the engine key is situated at either the ON or START position, a positive voltage is applied from the car battery 21 to the PS and IGN terminals 512 and 513. Since the AND gate 55 receives high level signals at its inputs through the PS and IGN terminals 512 and 513, it provides a high level signal to the PST switch 53 to make the terminal 532 contact the terminal 533. Accordingly, power is applied from the car battery 21 to the PS terminal 712 of telephone circuit 71. Since a positive voltage is applied to the base of transistor 543, the transistor 543 turns on, so that the voltage of battery 81 is terminated therethrough. On the contrast, the positive voltage at the IGN terminal 513 is applied to the IGN terminal 713 through the diode 542. Thus, the telephone circuit 71 operates with power from the car battery. The radio telephone set can therefore be used as an onboard set.

If the engine key is situated at either the OFF or ACC position, a positive voltage from the car battery 21 is applied only to the PS terminal 512. In this case, the terminal 532 of PST switch 53 is connected to the terminal 531, because the AND gate 55 provides a low level signal to the PST switch 53. As a result, power from the battery 81 is applied to the IGNT switch circuit 54. The power thus applied, however, is not applied to the IGN terminal 713, because the transistor 543 turns on due to the positive voltage at the PS terminal 512. The telephone circuit 71 does not therefore operate even if the manual switch 741 is closed. This prevents the car battery from discharging which otherwise occurs by inadvertently keeping the manual switch 741 closed when the car battery 21 is not being charged.

It is to be noted that when the engine key is set to the OFF position, the so-called dark current is not so large because only current from the built-in battery 81 flows through the ODP circuit 56 and the transistor 543. More specifically, if the resistors 561, 544 and 545 have resistances of greater than several tens of kiloohms, the dark current can be reduced to smaller than about 1 miliampere.

What is claimed is:

1. A radio telephone set which is to be used as a portable set and a set mounted on a vehicle with a vehicle battery, comprising:
    radio telephone circuit means including a load and first and second terminals, said load being provided with power through said first terminal;
    battery means for powering said radio telephone set when used as a portable set;
    third and fourth terminals for said vehicle battery, said fourth terminal being connected to said vehicle battery through an engine key circuit of said vehicle;
    first switching means connected to said first and third terminals and to said battery means for connecting said first terminal to said battery means in response to a first control signal and for switching the connection of said first terminal from said battery means to said third terminal in response to a second control signal;
    first gate means having two inputs connected to said third and fourth terminals, respectively, for providing said first control signal when either one or both of the voltages at said two inputs is low and for providing said second control signal when both the voltages at said two inputs are high; and
    second switching means connected to said second through fourth terminals and to said battery means for connecting said second terminal to said battery means when a voltage at said third terminal is low and for switching the connection of said second terminal from said battery means to said fourth terminal when the voltage at said third terminal is high.

2. A radio telephone set as claimed in claim 1, further comprising overdischarge preventing means connected between said battery means and said second switching means for preventing current from flowing from said battery means to said second switching means when the voltage of said battery means falls below a predetermined voltage.

3. A radio telephone set as claimed in claim 2, wherein said overdischarge preventing means comprises a resistor and a Zener diode which are connected in series between said battery means and said second switching means.

4. A radio telephone set as claimed in claim 1, wherein said load comprises transmitter means, receiver means and handset means, and wherein said radio telephone circuit comprises:
    power switch means connected between said load and first terminal for connecting said first terminal to said load in response to a power control signal;
    manual switch means for manually producing a manual switch signal; and
    second gate means for producing said power control signal in response to said manual switch signal and to a high level signal at said second terminal.

5. A radio telephone set as claimed in claim 4, wherein said second gate means comprises an AND gate having two inputs connected to said second terminal and said manual switch means, respectively, and an output; and an inverter connected between the output of said AND gate and said power switch means.

6. A radio telephone set as claimed in claim 1, wherein said second switching means comprises:
    transistor means having a base, an emitter and a collecter coupled to said third terminal, ground and said battery means, respectively; first diode means whose anode is connected to said collector and whose cathode is connected to said second terminal; and second diode means whose cathode is connected to said fourth terminal and whose cathode is connected to said second terminal.

7. A radio telephone set as claimed in claim 1, wherein said first gate means comprises and AND gate.

8. A radio telephone set as claimed in claim 1, wherein said battery for powering said radio telephone when used as a portable set is a battery built in said radio telephone set.

9. A radio telephone set comprising:
    battery means for powering said radio telephone set;
    first, second, third, and fourth terminals, said second terminal being connected to a vehicle battery through a vehicle engine key circuit;
    first gate means for providing a first switch signal in response to power application to said first and second terminals;
    first power switch means for selectively connecting said third terminal to said battery means and for switching said third terminal from said battery means to said first terminal in response to said first switch signal;
    switching means for selectively connecting said fourth terminal to said battery means and for switching power flow to said fourth terminal from said battery means to power flow from said second terminal to said fourth terminal in response to power application to said first terminal; and
    telephone circuit means connected to said third and fourth terminals.

10. A radio telephone set as claimed in claim 9 further comprising overdischarge prevention means connected between said battery means and said switching means for stopping power provision from said battery means to said switching means when the voltage of said battery means falls below a predetermined level.

11. A radio telephone set as claimed in claim 10, wherein said overdischarge prevention means comprises a series connection of a resistor and a Zener diode.

12. A radio telephone set as claimed in claim 9, wherein said telephone circuit means comprises a load which includes a transmitter, a receiver and a handset; manual switch means for manually producing a manual switch signal; second gate means for providing a second switch signal in response to said manual switch signal and to power application to said fourth terminal; and second power switch means for connecting said third terminal to said load in response to said second switch signal.

13. A radio telephone set as claimed in claim 12, wherein said second gate means comprises and AND gate connected to said fourth terminal and to said manual switch means for producing and AND gate output in response to said manual switch signal and power application to said fourth terminal; and an inverter for inverting the polarity of said AND gate output to produce said second switch signal.

14. A radio telephone set as claimed in claim 9, wherein said first gate means comprises an AND gate receiving signals from said first and second terminals for producing said first switch signal in response to the power application to said first and second terminals.

15. A radio telephone set as claimed in claim 9, wherein said switching means comprises a first resistor having two ends, one end thereof being connected to said first terminal; a transistor having a base, an emitter and a collector which are connected to the other end of said first resistor, ground and said battery means, respectively;
  a second resistor connected between said base and emitter;
  a first diode whose anode and cathode are connected to said collector and said fourth terminal, respectively; and
  a second diode whose anode and cathode are connected to said second and fourth terminals, respectively.

16. A radio telephone set as claimed in claim 9, wherein said battery means is a battery built in said radio telephone set.

17. A method of supplying a radio telephone set with power from one of a battery for portable operation of said radio telephone set and a vehicle battery, said radio telephone set comprising a telephone circuit and first, second, third, and fourth terminals, said first terminal being selectively connected to said vehicle battery, said second terminal being selectively connected to said vehicle battery through a vehicle engine key circuit, said method comprising the following steps of:

providing a first switch signal in response to power application to said first and second terminals;
connecting said third terminal to said battery for portable operation in response to no power application to said first and second terminals;
switching the connection of said third terminal from said battery for portable operation to said first terminal in response to said first switch signal;
providing a second switch signal in response to power application to said first terminal;
providing power to said fourth terminal from said battery for portable operation in response to no power application to said first terminal;
switching the electrical connection of said fourth terminal from said battery for portable operation to said second terminal in response to said second switch signal; and
connecting said telephone circuit to said third and fourth terminals.

18. A method as claimed in claim 17 further comprising the step of stopping power provision from said battery for portable operation to said telephone set when the voltage of said battery for portable operation falls below a predetermined level.

19. A method of supplying power to a radio telephone set from one of a battery for portable operation of said radio telephone set and a vehicle battery, said method comprising the following steps of:
responsive to no power application from said vehicle battery to said radio telephone set, supplying power from said battery for portable operation to said radio telephone set; and
responsive to power application from said vehicle battery to said radio telephone set through a vehicle engine key circuit, automatically switching said power supply to said radio telephone set from said battery for portable operation to said vehicle battery.

* * * * *